United States Patent

Schuman

[15] 3,648,276

[45] Mar. 7, 1972

[54] SEGMENTED SCALE

[72] Inventor: Ralph H. Schuman, Cleveland, Ohio

[73] Assignee: The Warner & Swasey Company, Cleveland, Ohio

[22] Filed: Dec. 11, 1969

[21] Appl. No.: 884,292

[52] U.S. Cl............................340/347 A, 33/125 A, 356/170
[51] Int. Cl..................G01b 11/04, G08c 9/06, H03k 13/02
[58] Field of Search...................340/347 PR; 33/114, 125 A, 33/125 M; 356/169, 139, 106–108, 170; 250/233, 239

[56] References Cited

UNITED STATES PATENTS 3,268,885  8/1966  Coyle et al..........................340/347 P
3,188,626  6/1965  Palmer...............................340/347 P
3,286,251  11/1966  Byun et al..........................340/347 P Primary Examiner—Maynard R. Wilbur
Assistant Examiner—Thomas J. Sloyan
Attorney—Yount and Tarolli

[57] ABSTRACT

An apparatus for determining the position of one part, such as a movable operating head of a machine tool, relative to a reference position on another part, such as a base of the machine tool, includes an improved scale assembly on one part of the machine tool. This scale assembly includes a plurality of identical scale segments which are spaced apart and independently adjusted relative to a standard, such as a laser interferometer, so that any error in the positioning of one scale segment does not affect the other scale segments. A relatively coarse scale is associated with the plurality of identical scale segments to provide a unique representation for each of the identical scale segments. Suitable control circuitry switches between leading and lagging signal generators in a reading assembly mounted on the other part of the machine tool to avoid activating signal generators at transitions between scale segments.

15 Claims, 9 Drawing Figures

Patented March 7, 1972

INVENTOR
RALPH H. SCHUMAN
BY Yount and Tarolli
ATTORNEYS

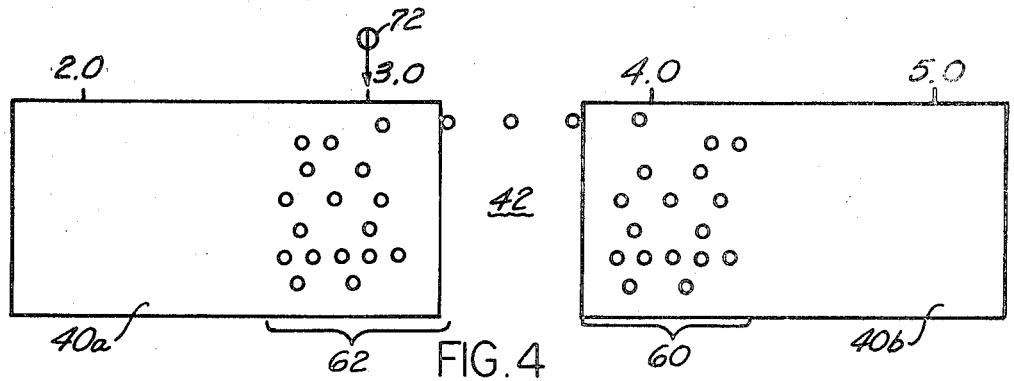

FIG. 4

$.001 = F_3 G_3 + \bar{F}_3 \bar{G}_3$
$.002 = \bar{G}_3 \bar{A}_3 E_3 + G_3 A_3 \bar{E}_3$
$.004 = \bar{G}_3(\bar{A}_3 C_3 + B_3 \bar{D}_3) + G_3(\bar{B}_3 D_3 + A_3 \bar{C}_3)$
$.008 = \bar{G}_3 \bar{B}_3 \bar{E}_3 + G_3 B_3 E_3$
$.010 = \bar{G}_3(A_3 + \bar{E}_3) + A_3 E_3$
$G_{21} = G_2(E_3 + \bar{A}_3 G_3) + F_2(A_3 + \bar{E}_3 \bar{G}_3)$
$.020 = \bar{G}_{21} \bar{A}_2 E_2 + G_{21} A_2 \bar{E}_2$
$.040 = \bar{G}_{21}(\bar{A}_2 C_2 + B_2 \bar{D}_2) + G_{21}(\bar{B}_2 D_2 + A_2 \bar{C}_2)$
$.080 = \bar{G}_{21} \bar{B}_2 \bar{E}_2 + G_{21} B_2 E_2$
$.100 = \bar{G}_{21}(A_2 + \bar{E}_2) + A_2 E_2$
$G_{11} = G_1(E_2 + \bar{A}_2 G_{21}) + F_1(A_2 + \bar{E}_2 \bar{G}_{21})$
$.200 = \bar{G}_{11} \bar{A}_1 E_1 + G_{11} A_1 \bar{E}_1$
$.400 = \bar{G}_{11}(\bar{A}_1 C_1 + B_1 \bar{D}_1) + G_{11}(\bar{B}_1 D_1 + A_1 \bar{C}_1)$
$.800 = \bar{G}_{11} \bar{B}_1 \bar{E}_1 + G_{11} B_1 E_1$
$1.000 = \bar{G}_{11}(A_1 + \bar{E}_1) + A_1 E_1$

FIG. 8

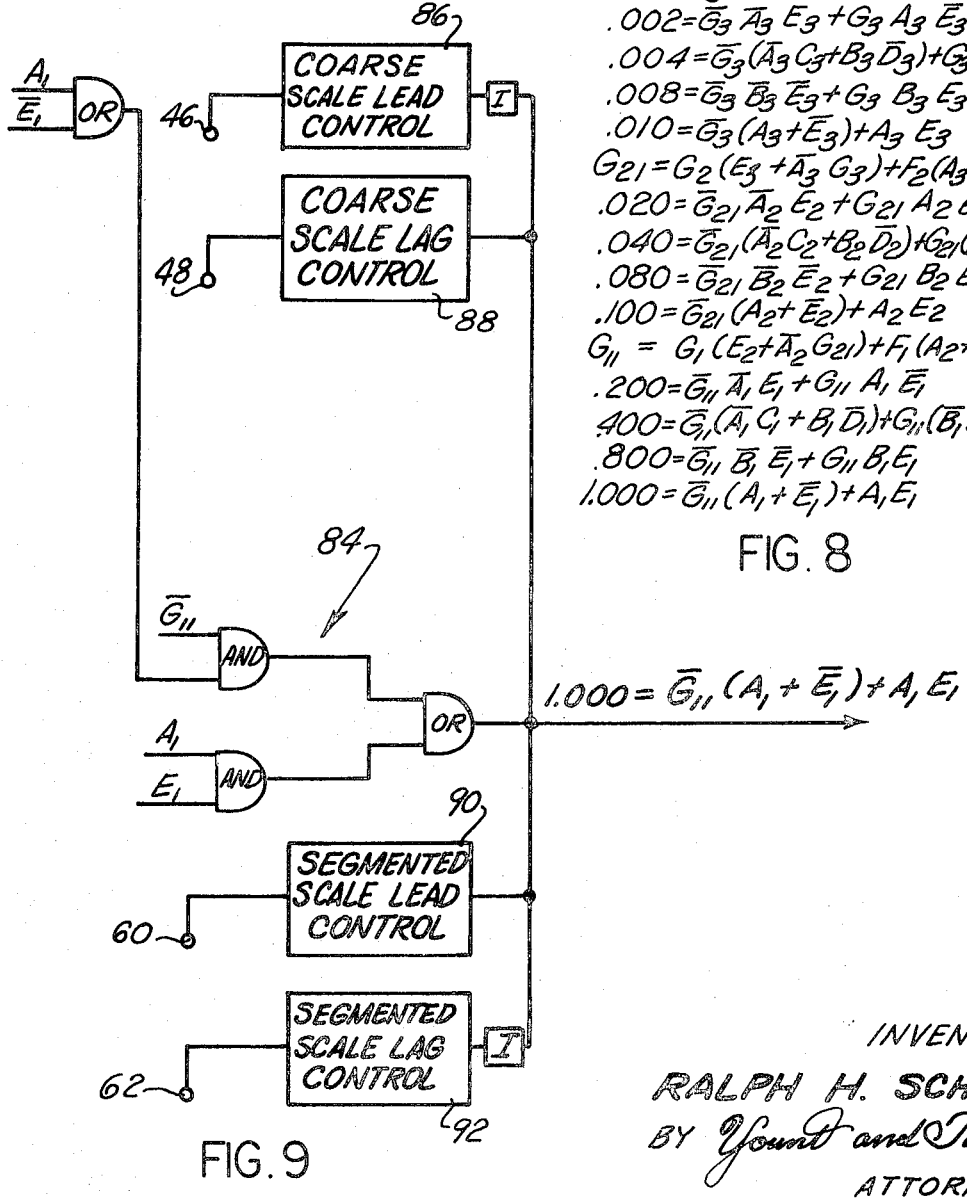

FIG. 9

INVENTOR
RALPH H. SCHUMAN
BY Yount and Tarolli
ATTORNEYS

INVENTOR
RALPH H. SCHUMAN
BY Yount and Tarolli
ATTORNEYS

SEGMENTED SCALE

The present invention relates to an apparatus for providing signals for use in determining the position of one part relative to another, particularly to such an apparatus in which a scale of the binary-type activates a signal generator to a first level or to a second level to provide a binary output signal.

A known apparatus for determining the position of one part relative to another includes a relatively long scale on which code tracks are accurately formed. The manufacture of this long and very accurate scale is relatively expensive and difficult. This is at least partially due to the presence of lens error and other factors impeding the use of known photographic reduction techniques to a accurately make a continuous scale which is relatively long. Once such a relatively long scale has been made, it must maintain dimensional stability throughout its entire length, despite age and changes in temperature and other environmental factors. If such a scale is damaged during use, replacement is relatively difficult and expensive.

One advantage of the present invention is that fewer code tracks are required to provide a given range of values. For example, conventional binary-coded decimal coding requires four code tracks per decade, whereas the invention requires only two code tracks per decade.

The present invention eliminates or at least alleviates the foregoing problems by the provision of a scale utilizing a plurality of individual segments which are relatively short in length. The short length of these scale segments enables them to be manufactured by known photographic reduction processes with a minimum of difficulty and inaccuracy. The relatively short scale segments can be individually and independently positioned relative to a base so that any error in positioning one scale segment does not affect the positioning of the other scale segments. The short length of each scale segment tends to minimize the effects of dimensional instability with age and changes in temperature and other environmental factors on the scale segments. Maintenance costs also tend to be minimized since a damaged scale segment can be replaced without replacing the other scale segments. The scale segments are advantageously identical so that they can be produced at a relatively low cost.

Accordingly, it is an object of this invention to provide a new and improved scale which includes a plurality of segments having a binary scale thereon for use in determining the position of one part relative to another.

Another object of this invention is to provide a new and improved scale in accordance with preceding object and wherein the segments are substantially identical to facilitate their manufacture.

Another object of this invention is to provide a new and improved apparatus for use in determining the position of one part relative to another including a plurality of scale segments for activating leading and lagging signal generators and control circuitry for switching between the outputs of the leading and lagging signal generators to avoid selecting the output of the signal generator at transitions between adjacent scale segments.

Another object of this invention is to provide a new and improved apparatus in accordance with the next preceding object wherein the leading and lagging signal generators cooperate with the scale segments to provide signals determinative of digits of a multidigit number for indicating the relative position of the parts and wherein the switching between the leading and lagging signal generators for determining lower order digits is controlled in response to the occurrence of predetermined variations in a higher order digit.

Another object of this invention is to provide a new and improved apparatus for determining the position of one part relative to another including a plurality of scale segments for use in determining lower order digits of a multidigit number for indicating the relative position of the parts and other scale means for use in determining the higher order digits of the multidigit number.

Another object of this invention is to provide a new and improved method for assembling a scale for use in determining the position of one part relative to another part including accurately positioning each one of a plurality of scale segments relative to one of the parts independently of the position of adjacent scale segments relative to the part.

These and other objects and features of the present invention will become more apparent upon a consideration of the following description taken in connection with the accompanying drawings wherein:

FIG. 4 is a schematic illustration depicting the relationship between leading and lagging signal generators and adjacent scale segments at the time of switching from the lagging signal generators to the leading signal generators;

Figures 5, 6, 7:
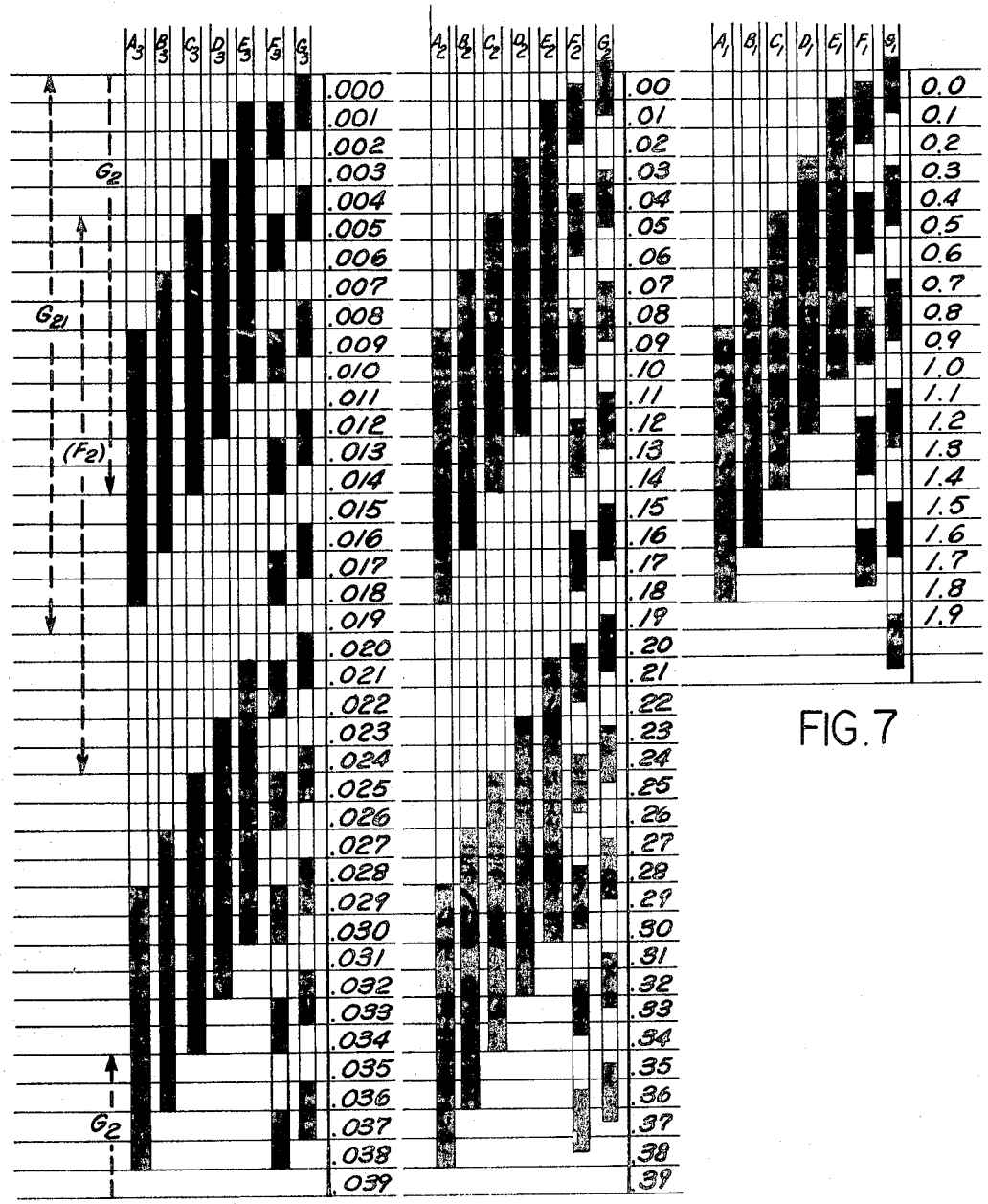
FIG. 5, 6 and 7 are schematic illustrations of a cyclic code which is associated with the scale segments in a specific preferred embodiment of the invention.

FIG. 8 sets forth Boolean equations for the code of FIG. 5-7; and

Figure 1:
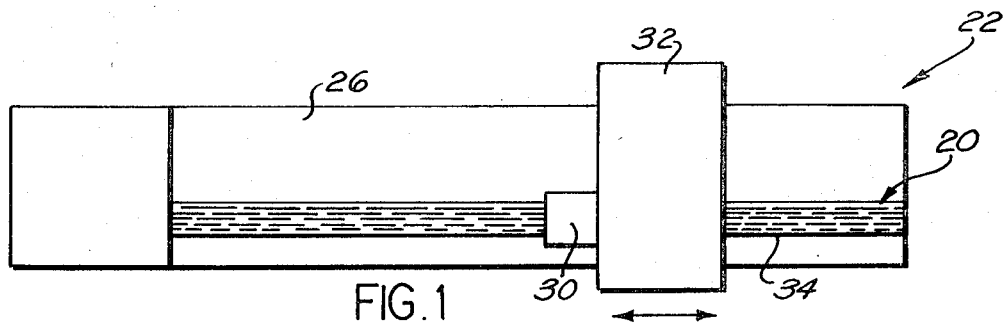
FIG. 1 is a machine tool which includes a scale assembly constructed in accordance with the present invention.
Figure 2:
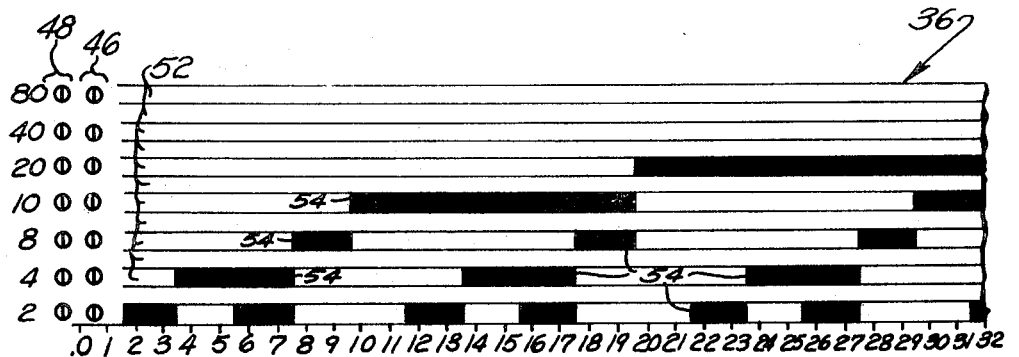
FIG. 2 is a schematic illustration of a portion of the scale assembly of FIG. 1 depicting the relationship between a plurality of the identical scale segments and a portion of the coarse scale.

FIG. 9 is a schematic illustration of logic circuitry for one of the FIG. 8 Boolean equations and for controlling the switching between leading and lagging signal generators associated with the scale assembly of FIG. 2.

The present invention provides an improved scale assembly or arrangement for use in determining the position of one part relative to another. This scale assembly includes a plurality of relatively short segments which are individually and independently positioned and held in a spaced relationship. Control circuitry is associated with leading and lagging signal generators in a reader assembly to avoid determining fine digits or digits of lesser significance with signal generators at transitions between scale segments. To facilitate manufacture, the scale segments are advantageously made identical to each other. The identical scale segments are associated with a relatively coarse scale to provide unique representations for each position of the reader assembly relative to the scale assembly.

While it is contemplated that a scale arrangement or assembly 20 constructed in accordance with the present invention will be used in many different environments, it is illustrated herein in association with a machine tool 22 having a fixed base 26. A reader assembly 30 is mounted on a movable operating head or section 32 and cooperates with the scale assembly 20 to provide signals for determining the position of the movable operating head 32 relative to the base 26. While the scale assembly 20 has been shown herein on the fixed base 26 and the reader assembly 30 on the movable operating head 32, it is contemplated that in certain environments the scale assembly could be moved relative to the reader assembly.

The reader assembly 30 includes sensors or signal generators 46, 48, 60, 62, and 66, formed by photocells and associated light sources, which provide signals determined by the position of the movable operating head 32 relative to the base 26. While in the specific preferred embodiment of the invention illustrated herein these signals define a code number representative of the position of the operating head 32 with respect to base 26, it is contemplated that the leading and lagging signal generators could merely provide pulses or signals determined by the relative movement of the operating head and base. A suitable counter arrangement would be stepped by the pulses to enable the position of the operating head 32 relative to the base 26 to be determined. It is also contemplated that although the scale assembly 20 is illustrated as being disposed in a linear relationship with the base 26, the scale assembly could be disposed in an arcuate or even a circular relationship with a base or part on which it is supported, and with suitable modifications in the code used, be adapted to indicate rotational displacement in any desired units.

The scale assembly 20 (FIG. 2) includes a support member 34 and a coarse scale 36 which cooperates with the reader assembly 30 to determine coarse or higher order digits of a number indicative of the position of the operating head 32 relative to the base 26. In the illustrated embodiment of the invention, the coarse scale 36 is unsegmented or continuous. The scale assembly 20 also includes a segmented scale 38 made up of a plurality of scale segments 40 which in a specific preferred embodiment of the invention are identical to each other to facilitate their manufacture. The scale segments 40 cooperate with the reader assembly 30 to determine the fine or lower order digits of the number indicative of the position of the operating head 32 relative to the base 26. Since the scale segments 40 are identical, coarse scale 36 is necessary to provide unique representations for positions adjacent each of the scale segments 40. Thus, the finest unit of the coarse scale 36 has an extent or length representative of the combined extent or length of one of the scale segments 40 and a space or transition area 42 between that scale segment and the next adjacent scale segment. Of course, the extent or quantum represented by a unit of the scale 36 could be less than that represented by a scale segment 40 and transition area 42.

In order to reduce or minimize the accuracy with which the coarse scale 36 must be formed, a leading group of signal generators or sensors 46 and a lagging group of signal generators or sensors 48 are provided in the reader assembly 30 for cooperating with code tracks 52 of the coarse scale. The code tracks 52 include code zones 54 (indicating transparent areas of the coarse scale) for activating the leading and lagging groups of signal generators 46 and 48 in accordance with a well-known binary coded decimal system to provide one or more digits of the decimal number indicative of the relative position of the operating head 32 and base 26. For example, the binary digits representing the value of each decimal digit may be weighted $2^0$, $2^1$, $2^2$ and $2^3$. The least significant binary digit represented by the code zones 54, however, is weighted $2^1$ and not $2^0$ in the four digit binary number representing the value of a given order decimal digit. The $2^0$ order binary digit of the four digit binary number representing the value of the given order decimal digit is provided by cooperation between the reader assembly 30 and the segmented scale 38 in accordance with the code set forth schematically in FIGS. 5–7 and Boolean equations of FIG. 8. The binary $2^1$, $2^2$ and $2^3$ order digits representing the valve of the given order decimal digit are determined by the cooperation between the reader assembly 30 and the code zones 54 of the coarse scale 36. It will be recognized that scale 36 is coded for 1, 2, 4, 8 binary coded decimal. Suitable logic circuitry is provided in the reader assembly 30 to convert multidigit binary numbers indicative of the relative position of the base 26 and operating head 32 to a corresponding multidigit decimal number. The scale 36 may also be constructed in accordance with the code used on segmented scale 38, if desired. In fact, scale 36 need not have a linear configuration, but may be embodied in a disc encoder driven by a tape and sprocket or other suitable arrangement for rotating it proportionally to relative position between base 26 and operating head 32.

The leading and lagging groups of signal generators 46 and 48 are controlled in dependence upon the value of a selected control digit determined by the segmented scale 38. In the illustrated embodiment of the invention, the most significant $2^0$ order binary digit represented by the segmented scale has been selected as the control digit. Accordingly, logic circuitry in the reader assembly 30 switches between the leading and lagging groups of signal generators 46 and 48 upon a change in the value of the control digit. The leading signal generators 46 are utilized when the value of the control digit is 0 and the lagging signal generators 48 are utilized when the value of the control digit is 1. Thus, the leading signal generators 46 are used to read even numbers on the scale 36, while the lagging signal generators 48 are used to read odd numbers on the scale 36. This enables the code zones 54 of each code track 52 to begin and end within a tolerance range of approximately one-half the nominal length of the code zones 54 of the next finer code track 52.

Figure 3:
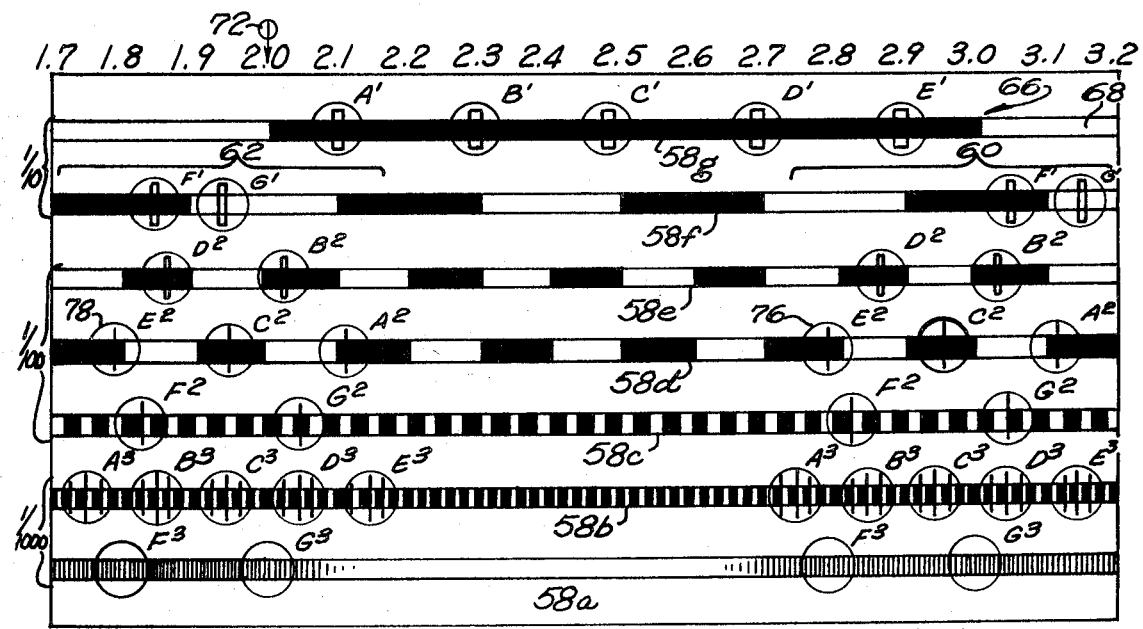
FIG. 3 is an enlarged schematic illustration of one of the scale segments.

One of the scale segments 40 is illustrated in FIG. 3 and has code tracks 58 (wherein the shaded areas indicate opaque areas of the scale and unshaded areas indicate transparent areas of the scale, the space between code tracks being opaque) which cooperate with a leading group of signal generators or sensors 60 and a lagging group of signal generators or sensors 62. In addition to the leading and lagging groups of signal generators 60 and 62, a single set of sensors or signal generators, indicated generally at 66, cooperates with a code track 68. The signal generators 60, 62 and 66 are of known construction and include a plurality of photoelectric cells, indicated schematically by circles in FIG. 3, forming a part of the reader assembly 30 and cooperating with a mask or masks having slits indicated by the lines or rectangles in the circles in FIG. 3. The scale segment 40, in the illustrated embodiment of the invention, is formed of glass and has dark or opaque code zones in which no signal or pulse is provided from the associated photoelectric cells of the signal generators or sensors 60, 62, 66 and clear areas or transparent code zones in which light shines through the scale segment 40 to activate the associated photocells of the signal generators 60, 62, 66. Since the scale segment 40 has a relatively short length, in the specific illustrated embodiment of the invention the length of the scale segment is approximately 1½ inches, the opaque and transparent areas of the scale segment can be very accurately formed by known photoreduction processes. The relatively short length of the scale segment rends to minimize distortion due to aberations in the lens of any camera or other optical equipment utilized in the photoreduction process. Since the scale segments 40 are identical and have code tracks with code zones or areas of the same length, the unit cost of making the scale segments tends to be minimized.

The scale segments 40 are individually mounted on the support member 34 in a spaced apart relationship with transition zones or areas 42 between adjacent scale segments. The length or extent of the transition area 42 is greater than the extent or length of the code zones on the code tracks 58. Therefore, control circuitry is provided in the reader assembly 30 to switch between the leading and lagging groups or signal generators 60 and 62 to avoid selecting signals from signal generators that are over or adjacent to one of the transition areas 42. It should be noted that the length of the signal zone for the code track 68 is greater than the length of the transition area 42. Therefore, leading and lagging signal generators are not required and the signal generators 66 are activated as they pass across or cooperate with the transparent transition areas 42 just as though they were passing over transparent areas of code track 68.

The switching between leading and lagging groups of signal generators 60 and 62 is illustrated schematically in FIG. 4. The lagging group of signal generators 62 is activated to read to code tracks 58 for numbers where a selected control digit is even, while the leading group of signal generators 60 are activated to read numbers where the selected control digit is odd. In the presently preferred embodiment the code tracks 58 and 68 and their associated light sources and photocells provide cyclic codes indicating the binary numbers representing the value of decimal digits weighted $10^{-3}$, $10^{-2}$, and $10^{-1}$, and the $2^0$ order digit of the binary number representing the value of the decimal digit weighted $10^0$. It is this $2^0$ order digit that is utilized as the control digit for switching between lead and lag signal generators.

In the presently preferred embodiment, the light sources are continuously energized and switching between photocell output signals is accomplished by electronic switching circuits. Depending upon the characteristics of the light source, such as a gallium arsenide cell, it may be desirable to switch the energization of light sources rather than photocell outputs. Therefore, reference to activating a signal generators, as used in this specification, shall be taken to mean either of these two schemes.

When the reader assembly 30 is precisely aligned with a whole unit of the scale segment 40, for example, when it is aligned at a position represented by the decimal number 2.0 as indicated by a mark 72 in FIG. 3, or the decimal number 3.0 as indicated by the mark 72 in FIG. 4, both the leading and lagging groups of signal generators 60 and 62 are activated. This reading is unambiguous since the code defined by the code tracks 58 is cyclical and the leading and lagging signal generators 60 and 62 are disposed in the same relationship relative to a cycle of the code. It should be noted that the purpose of the lead-lag arrangement of signal generators 60 and 62 is not to increase accuracy, but to permit leapfrog reading of scale segments 40, each segment being read twice during a transition of the reader assembly 30, once by the leading signal generators and once by the lagging signal generators to provide code signals for a distance equal to the distance between centers of two adjacent scale segments. Signal generators 46 and 48 are arranged according to the prior art method, one slightly leading the cycle and one slightly lagging to increase accuracy by eliminating ambiguity at transition points. Thus, in the specific illustrated embodiment of the invention a leading signal generator 76 and a corresponding lagging signal generator 78 are spaced a full unit apart and are located in the same relationship with repetitive code zones of the associated code track 58 (see FIG. 3). The other leading signal generators 60 and 62 are similarly located relative to the associated lagging signal generators.

Assuming that the operating head 32 and reader assembly 30 are being moved toward the right from the position of FIG. 3, logic circuitry in the reader assembly 30 activates the lagging group of signal generators 62 to read the code tracks 58 between 2.0 and 3.0 on the scale segment 40. When the rightward movement of the reader assembly 30 brings it to the position in which it is aligned with the 3.0 digit of the scale segment 40a of FIG. 4, both the leading group of signal generators 60 and the lagging group of signal generators 62 are operable to provide signals indicative of the position of the reader assembly relative to scale segments 40. It should be noted that the entire leading group of signal generators 60 is cooperating with the scale segment 40b and is in advance of the transition area 42 between the scale segments 40a and 40b. Since the leading and lagging groups of signal generators 60 and 62 are in the same position relative to a cycle of the cyclic code on the scale segments 40a and 40b, both groups of signal generators provide the same signals.

As the reader assembly 30 is moved toward the right from the position illustrated in FIG. 4, logic circuitry in the reader assembly 30 switches to the leading group of signal generators 60 which cooperate with the scale segment 40b while the lagging group of signal generators 62 is passing over the transition area 42. Thus, by utilizing the lagging group of signal generators 62 to read one scale segment while the leading group of signal generators 60 is passing across a transition area 42 and by using the leading group of signal generators to read the next scale segment while the lagging group of signal generators is passing across the transition area, activation of signal generators while they are over transition areas is avoided. It should be noted that the switching between leading and lagging signal generators associated with lower order digits is controlled in dependence upon a higher order digit. In the present embodiment, the control digit is the $2^0$ order digit of the binary number representing the value of the $10^0$ order decimal digit, and it controls the lead-lag switching for the signal generators associated with the binary numbers for representing the values of the $10^{-3}$, $10^{-2}$ and $10^{-1}$ order decimal digits. Although in the specific preferred embodiment of the invention illustrated in the drawings the leading and lagging groups of signal generators 60 and 62 cooperate with code tracks to provide a unique numerical representation of displacement between the operating head 32 and base 26, it is contemplated that the code tracks and signal generators could be used to provide pulse signals for use with an up-down counter for indicating the relative position between the operating head 32 and base 26.

The scale segments 40 are individually and independently mounted in the assembly 20 relative to a reference so that any error in positioning one of the scale segments does not affect the position of the other scale segments relative to the reference. Thus, each of the scale segments or members is mounted with known fasteners on the member 34 at different distances from a reference mark or position. Although there are many different techniques available for accurately positioning the scale segments 40 relative to the base 26 and the reference mark or position, laser interferometer techniques can advantageously be utilized to accurately position the scale segments. Of course, the length of the transition area 42 between scale segments can be varied to suit the particular code being used. In fact, the ends of the scale segments could, if desired, be placed in abutting or almost abutting engagement.

In addition to the accuracy obtained by independently positioning each of the scale segments 40, the accuracy of the segmented scale 38 is enhanced by the short length of the scale segments as explained above. Also, the transition areas 42 between adjacent scale segments 40 minimizes the effect of dimensional instability with age and changes in temperature and other environmental factors. Any dimensional instability which may be present in one of the spaced-apart scale segments 40 is not transmitted to the adjacent scale segments. Of course, if one of the segments 40 is damaged during operation of the machine tool 22, the damaged scale segment 40 can be replaced without replacing the scale segments which have not been damaged.

Although it is contemplated that many different codes can be utilized in association with the scale segments 40, a specific preferred code is illustrated schematically in FIGS. 5 through 7 and corresponds to the Boolean equations set forth in FIG. 8. Code tracks 58 formed on the scale segments 40 in accordance with this code cooperate with the signal generators 60, 62 and 66 (FIG. 3) to provide signals determinative of the value of a plurality of multidigit binary numbers. Each of these multidigit binary numbers represents the value of one digit of a decimal number. The lower order digits of the decimal number determined in association with the code segments 40 are combined with higher order digits determined in association with the coarse scale 36 to provide a multidigit decimal number for accurately indicating the position of the operating head 32 relative to the base 26.

In the specific illustrated embodiment of the invention, the binary numbers representing the $10^{-3}$, $10^{-2}$, and $10^{-1}$ order digits of the multidigit decimal number and the $2^0$ order digit of the binary number representing the $10^0$ order digit of the multidigit decimal number are determined in association with code tracks 58 and 68 and signal generators 60, 62 and 66. The values of the remaining binary digits of the binary number representing the $10^0$ order decimal digit and the values of the binary numbers representing the $10^1$ order digit and any higher order decimal digits are determined in association with code tracks 52 and signal generators 46 and 48. The derivation of each of the binary and decimal digits by logical combination of the signals from the several signal generators is fully described by the Boolean equations of FIG. 8.

More particularly, the code signals $F_3$ and $G_3$ (FIG. 5) are formed by code track 58a of FIG. 3 in cooperation with similarly designated signal generators which are phase-displaced 90° relative to the equal length opaque and transparent code zones of code track 58a. The code signals $A_3$, $B_3$, $C_3$, $D_3$ and $E_3$ (FIG. 5) are formed by the code track 58b of FIG. 3 in cooperation with similarly designated signal generators which are equally phase displaced relative to the equal length opaque and transparent code zones of code track 58b. Code signals $A_3$, $B_3$, $C_3$, $D_3$, $E_3$, $F_3$ and $G_3$ define a cyclic code having 20 unique combinations. The values of the four digits of the binary number indicating the value of the $10^{-3}$ order decimal digit are derived from these 20 unique combinations, along with the value of the binary $2^0$ order digit of the binary number indicating the value of the next significant (i.e., $10^{-2}$) order decimal digit.

The code signals $F_2$ and $G_2$ (FIG. 6) are formed by the code track 58c of FIG. 3 in cooperation with similarly designated signal generators which are phase displaced relative to the equal lengths opaque and transparent code zones of code track 58c. The code signals $A_2$, $B_2$, $C_2$, $D_2$, and $E_2$ are formed by code tracks 58d and 58e in cooperation with similarly designated signal generators which are equally phase displaced relative to the equal length opaque and transparent code zones of code tracks 58d and 58e. It should be noted that code tracks 58d and 58e are 180° out of phase, and therefore, signal generators $A_2$, $B_2$, $C_2$, $D_2$ and $E_2$ could all have cooperated with either code track 58d or 58e, eliminating the need for the other code track. However, using both code tracks 58d and 58e as shown in FIG. 3 permits a more convenient positioning of the leading and lagging signal generators $A_2$, $B_2$, $C_2$, $D_2$ and $E_2$ in the reader assembly 30.

The code signals $F_2$ and $G_2$ are combined with some of the code signals formed by code tracks 58a and 58b to define a code signal $G_{21}$ that has code zones having a length 10 times as long as code signals $G_3$, but because of its logical dependency on code signal $G_3$ (see Boolean equations of FIG. 8) it has a very precise beginning and ending tolerance. This code signal $G_{21}$ is combined logically with the $A_2$, $B_2$, $C_2$, $D_2$ and $E_2$ code signals to define the $2^1$, $2^2$ and $2^3$ order digits of the binary number representing the value of the $10^{-2}$ order decimal digit, and also to define the $2^0$ order digit of the binary number representing the next significant (i.e., $10^{-1}$) order decimal digit.

The code signals $F_1$ and $G_1$ (FIG. 7) are formed by the code track 58f of FIG. 3 in cooperation with similarly designated signal generators which are phase displaced relative to the code zones of code track 58f in the same manner that signal generators $F_2$ and $G_2$ are displaced with respect to code track 58c. Code signals $A_1$, $B_1$, $C_1$, $D_1$ and $E_1$ are formed by code track 58g in cooperation with similarly designated signal generators which are phase displaced relative to the code zones of code track 58g in the same manner that signal generators A, B, C, D and E are displaced with respect to code track 58g. It should be noted, however, that there is only one each of signal generators $A_1$, $B_1$, $C_1$, $D_1$ and $E_1$, no lead-lag arrangement being required.

Code signals $F_1$ and $G_1$ are combined with some of the code signals formed by code tracks 58c, 58d and 58e to define a code signal $G_{11}$ that has code zones having a length 10 times as long as code signal $G_{21}$, but because of its logical dependency on code signal $G_{21}$ which in turn logically depends upon code signal $G_3$ (see Boolean equations of FIG. 8) it has a very precise beginning and ending tolerance. Code signal $G_{11}$ is combined logically with the $A_1$, $B_1$, $C_1$, $D_1$, and $E_1$ code signals to define the $2^1$, $2^2$ and $2^3$ order digits of the binary number representing the value of the $10^{-1}$ order decimal digit, and also define the $2^0$ order digit of the binary number representing the next significant (i.e., $10^0$) order decimal digit.

It will be appreciated that each digit of the decimal number, with slight variations, is derived from the code signal in the same way, and that because all the binary digits representing decimal digits are logically dependent upon the code signal $G_3$ either by direct logical combination or by control of lead-lag sensing, each binary digit, and therefore each decimal digit, is determined as accurately as the code signal $G_3$.

It should be understood that any suitable codes could be utilized in connection with scale segments 40. The codes of FIGS. 5 through 7 and relationship of the signal generators to the code tracks is more fully set forth in my copending application Ser. No. 560,951, filed June 6, 1966, entitled Analogue-to-Digital Converter, and now abandoned.

Switching between the leading and lagging groups of signal generators 46 and 48 associated with the coarse scale 36 and the switching between the leading and lagging groups of signal generators 60 and 62 associated with segmented scale 38 is controlled by the value of a control digit, which, as noted above, in the presently preferred embodiment of the invention is the $2^0$ order digit of the binary number representing $10^0$ order decimal digit. The value of the control digit is either 0 or 1, and is determined by the Boolean equation and logic circuitry 84 of FIG. 9. When the binary $2^0$ order digit is 0, the decimal digit is partially represents is even and when the binary $2^0$ order digit is 1, the decimal digit it partially represents is odd.

When the output signal from logic circuitry 84 indicates that the value of the $2^0$ binary order digit is 0, therefore, the value of the $10_0$ order decimal digit is even, logic or control circuitry 86 in the reader assembly 30 switches to the leading group of signal generators 46 which cooperate with the unsegmented or coarse scale 36. When the value of the binary $2^0$ digit is 1, and therefore, the value of the $10^0$ order decimal digit is odd, control or logic circuitry 88 switches to the lagging signal group of generators 48. The signal generators 46 and 48 are spaced apart so that by switching between the leading and lagging signal generators, the tolerance range for the binary order digits $2^1$, $2^2$, $2^3$, etc., can be equal to approximately one-half of a unit to facilitate the manufacture of the coarse scale 36. It should be noted here that the coarse scale 36 may be formed of a number of separate pieces, but when assembled for use forms a continuous rather than an interrupted scale like segmented scale 38.

The logic circuitry for switching between the leading and lagging signal groups 60 and 62 associated with the segmented or fine scale 38 is indicated at 90 and 92 in FIG. 9. When the $2^0$ order digit has a value of 1, the leading group of signal generators 60 is activated by the logic circuitry 90. When the value of the $2^0$ order digit is 0, the logic circuitry 92 switches to the lagging group of signal generators 62. Of course, there is suitable logic circuitry in the reader assembly 30 corresponding to the Boolean equations of FIG. 8 for determining the value of the other order digits of the multidigit readout number which indicates the position of the operating head 32 relative to the base 26.

From the foregoing description, it can be seen that the scale arrangement 20 includes a primary or unsegmented scale 36. The secondary scale 38 is made up of a plurality of scale segments 40. Each of the scale segments 40 is accurately positioned relative to the mounting member 34 independently of the adjacent scale segments to prevent the accumulation of error in positioning of the scale segments. To further minimize error or inaccuracies in the location of the scale segments 40 relative to the base 26, the scale segments are spaced apart by a transition zone or area 42 so that temperature and other environmental effects on one scale segment do not affect the position of adjacent scale segments. To avoid reading the transition area 42, suitable control circuitry is provided for switching between leading and lagging groups of signal generators 60 and 62. The switching between leading and lagging groups of signal generators 60 and 62 is in response to changes of a relatively significant digit since the transition zone 42 has an extent which is greater than the extent of a unit of the digits of lesser significance.

Since the scale segments 40 are relatively short in length, they can be readily manufactured using known photographic reduction techniques. The short length of the scale segments 40 tends to enhance the accuracy that can be obtained on equipment used in these photographic reduction processes. The scale segments 40 are advantageously identical to each other to reduce the unit cost of making the scale segments.

What is claimed is:

1. Apparatus for use in determining the displacement of one machine part relative to another machine part, a plurality of scale members connected to one of said machine parts, each scale member having a code track comprised of a plurality of areas of a first characteristic separated by a plurality of areas of a second characteristic, each of said scale members being located along a path and spaced apart from each adjacent scale member such that said code tracks cooperate to provide a discontinuous code track along said path, first and second sensing means connected to the other of said machine parts, said sensing means being cooperable with areas of said first characteristic on each of said scale members in turn to provide signals of a first level and cooperable with said areas of said second characteristic on each of said scale members in turn to provide signals of second level, said first and second sensing means being spaced apart along said path by a distance greater than the space between any two adjacent scale members, means for receiving the signals from said first and second sensor means, gating means for blocking transmission of signals from said first sensing means when said first sensing means is disposed at a space between adjacent scale members while gating signals from said second sensing means to said means for receiving signals and for blocking transmission of signals from said second sensing means when said second sensing means is disposed at a space between adjacent scale members while gating signals from said first sensing means to said means for receiving signals.

2. Apparatus as set forth in claim 1 wherein each of said scale members is identical and interchangeable with any other scale member of said plurality of scale members.

3. Apparatus for use in determining the position of one part of a machine relative to another part of a machine, said apparatus comprising a plurality of sensors connected with the one part, a plurality of spaced apart scale members connected with the other part for activating a first group of said plurality of sensors to provide signals for determining first digits of a multidigit number indicative of the relative position of the parts, each of said scale members being spaced from adjacent scale members to form a longitudinally extending array of spaced apart scale members, and longitudinally extending scale means connected with the other part and having a longitudinal extent which is at least substantially as great as the longitudinal extent of said array of scale members, said scale means being operable to activate a second group of said plurality of sensors to provide signals for determining second digits of the multidigit number, said second digits of said multidigit number being of greater significance than said first digits of said multidigit number, means for receiving signals transmitted from said first group of sensors, means for effecting movement of the machine parts to a plurality of different positions relative to each other to move said first group of sensors into a sensing relationship with each of said scale members in turn upon movement of the machine parts to different positions relative to each other, and means for switching between sensors in said first group of sensors to avoid transmitting signals to said receiving means from sensors disposed at a space between adjacent scale members.

4. Apparatus as set forth in claim 3 wherein each of said scale members includes first code track means for defining at least one cycle of a cyclic code determinative of one of said first digits of said multidigit number, said first code track means being identical on each of said scale members.

5. Apparatus as set forth in claim 3 wherein each of said scale members includes code track means for defining a code and having a unit with an extent corresponding to the extent of the least significant digit of said first digits of said multidigit number, said scale members being spaced apart by a distance which is greater than the extent of a plurality of said units.

6. Apparatus as set forth in claim 3 further including means for enabling each of said scale members to be individually adjusted relative to said other part to thereby facilitate the elimination of cumulative error positioning of said scale members relative to said other part.

7. Apparatus for use in determining the position of one part of a machine relative to another part of the machine upon relative movement between the machine parts, said apparatus comprising a plurality of spaced apart scale members connected with the one machine part in a longitudinally extending array with spacing between adjacent scale members, each of said spaced apart scale members having a cyclic code track which is aligned with a cyclic code track on an immediately preceding one of said spaced apart scale members and with a cyclic code track on an immediately succeeding one of said spaced apart scale members to provide a combined code track made up of a plurality of sections each of which is disposed on one of said spaced apart scale members with a discontinuity between each of said sections at spaces between said spaced apart scale members, each of said cyclic code tracks including a plurality of areas of a first characteristic separated by areas of a second characteristic, first and second sensor means connected with the other machine part for sensing areas on each of said spaced apart scale members in turn upon movement of the machine parts to different positions relative to each other, each of said sensor means providing a signal of a first level upon sensing one of said areas of a first characteristic and a signal of a second level upon sensing one of said areas of a second characteristic, means for receiving signals transmitted from said first and second sensor means, means for effecting movement of the machine parts to a plurality of different positions relative to each other to move said first and second sensor means into a sensing relationship with each of said spaced apart scale members in turn upon movement of the machine parts to different positions relative to each other, and means for switching between said first and second sensor means to avoid transmitting signals to said receiving means from one of said first and second sensor means when said one sensor means is disposed at a space between adjacent scale members.

8. Apparatus as set forth in claim 7 wherein said first and second sensor means cooperate with said cyclic code track to provide signals to determine a first digit of a multidigit number for indicating the relative position of the parts, each of said scale members further including a second cyclic code track cooperable with said first and second sensor means to provide signals to determine a second digit of said multidigit number which is of higher order than said first digit, said switching means being operable to switch between said first and second sensor means in response to predetermined changes in said second digit.

9. Apparatus as set forth in claim 7 wherein each of said scale members defines a plurality of units of a predetermined extent, said scale members being located in a spaced apart relationship with the space between scale members having an extent which is greater than the extent of one of the units.

10. Apparatus as set forth in claim 7 wherein said first and second sensor means are disposed in the same position relative to a cycle of the cyclical code track, said switching means being operable to switch between said first and second sensor means without changing the level of a signal being received by said means for receiving signals.

11. An apparatus as set forth in claim 7 wherein said first sensor means is spaced from said second sensor means by a distance corresponding to a distance represented by a whole number of cycles of a cyclic code signal resulting from cooperation between said sensor means and said scale members.

12. Apparatus as set forth in claim 7 wherein each of said scale members is identical and interchangeable with any other scale member of said plurality of scale members.

13. Apparatus as set forth in claim 12 further including scale means operatively connected to the one part for use in determining the position of said parts relative to said plurality of identical scale members.

14. Apparatus as set forth in claim 7 further including means for enabling each of said scale members to be individually adjusted relative to said other part to thereby facilitate the elimination of cumulative error in positioning of said scale members relative to said other part.

15. Apparatus for use in determining the position of one part of a machine relative to another part of the machine upon relative movement between the machine parts, said apparatus comprising a plurality of scale members mounted on the one machine part in a spaced apart relationship and disposed in a longitudinally extending array, each of said scale members having a plurality of cyclic code tracks each of which is formed by a plurality of areas of a first characteristic separated by areas of a second characteristic, longitudinally extending scale means connected with the one machine part and having a longitudinal extent which is at least substantially as great as the longitudinal extent of said array of scale members, first and second groups of sensor means mounted on the other machine part for sensing areas on each of said scale members in turn upon movement of the machine parts to different positions relative to each other, each of said sensor means providing a signal of a first level upon sensing one of said areas of a first characteristic and a signal of a second level upon sensing one of said areas of a second characteristic, said scale members and first and second sensor means cooperating to provide binary signals for determining first digits of a multidigit number indicative of the position of the machine parts, one of the cyclic code tracks on each of said scale members having a plurality of relatively short areas of said first and second characteristics and which cooperative with said first and second sensor means to define a most significant digit of the multidigit number, said scale members being spaced apart by a distance which is at least as great as the length of one of said areas which cooperate with said first and second sensor means to define a least significant digit of the multidigit number, a third group of sensor means mounted on the other machine part for sensing said scale means to provide signals for determining second digits of said multidigit number, said second digits of said multidigit number being of greater significance than said first digits of said multidigit number, means for receiving signals transmitted from the sensor means of said first, second and third groups of sensor means, means for effecting movement of the machine parts to a plurality of different positions relative to each other to move each of the sensor means of said first and second groups of sensor means into a sensing relationship with each of said scale members in turn upon movement of the machine parts to different positions relative to each other, and means for switching between said first and second groups of sensor means to avoid transmitting signals to said receiving means from sensor means disposed at a space between adjacent scale members.

* * * * *